(No Model.)
W. L. FAY.
TRICYCLE.
No. 397,348.  Patented Feb. 5, 1889.
FIG. I.
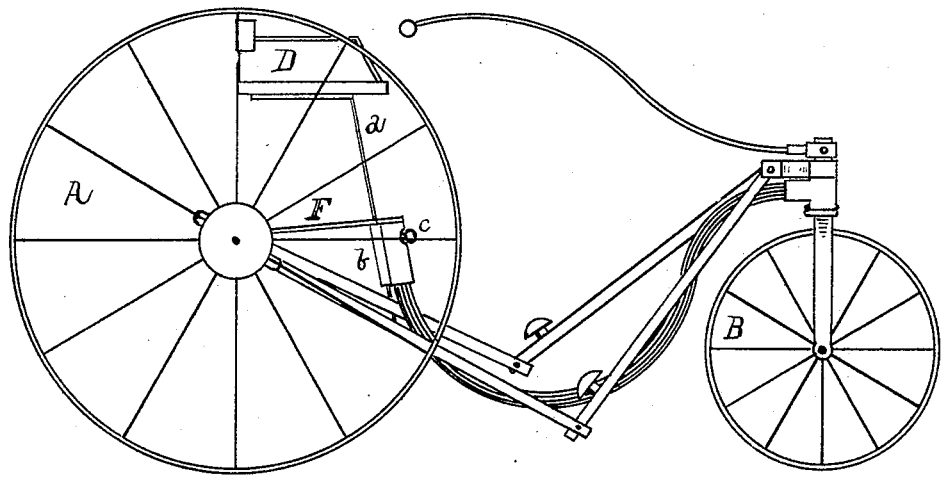
FIG. II.
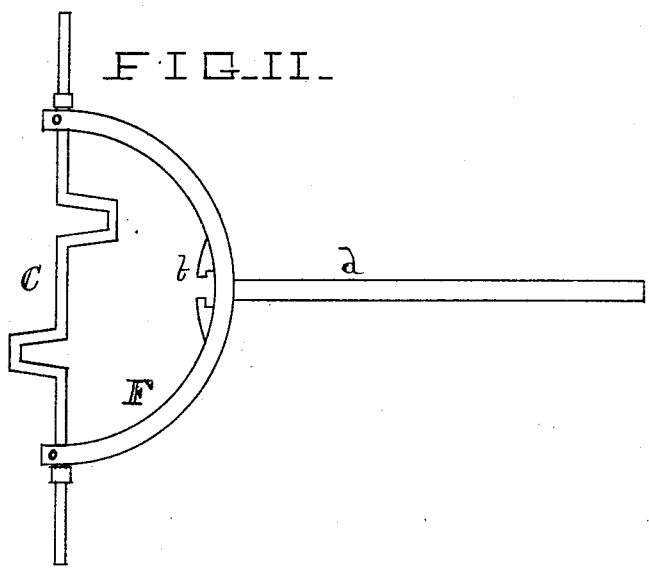
Witnesses.
Inventor.
W. L. Fay

UNITED STATES PATENT OFFICE.

WINSLOW LAMARTINE FAY, OF ELYRIA, OHIO.

TRICYCLE.

SPECIFICATION forming part of Letters Patent No. 397,348, dated February 5, 1889.

Application filed June 11, 1888. Serial No. 276,756. (No model.)

*To all whom it may concern:*

Be it known that I, WINSLOW LAMARTINE FAY, a citizen of the United States, residing at Elyria, in the county of Lorain and State of Ohio, have invented a new and useful Improvement in Tricycles, of which the following is a specification.

My invention relates to improvements in the springs and construction of the frame to tricycles in which the steering or guiding wheel runs in a line midway between the main wheels.

The object of my invention is to provide a spring in combination with the reach that will form the frame, be simple, strong, easy, and cheap of construction, and permit of the seat being made adjustable. I attain these objects by means of the mechanism illustrated in the accompanying drawings, in which—

Figure I is a side elevation of a tricycle provided with my spring and frame. Fig. II is a plan view of my spring and reach attached to the axle of a tricycle.

Similar letters refer to similar parts throughout the several views.

A represents one of the main wheels to a tricycle.

B represents the steering or guiding wheel.

C represents a suitable axle provided with a double crank near its center, to which are attached the propelling or treadle bars.

D represents a suitable seat supported nearly over said axle by an upright spring, $a$, which passes down through a slot in the part $b$, and is secured at any point desired by means of a set-screw, $c$.

F represents a crescent spring the ends of which rest on boxes on the axle, and at the front and center is attached, by means of the part $b$, the reach $d$. This spring F forms a brace for connecting the axle and reach $d$, and also an easy spring for supporting the seat and standard.

The other parts of the tricycle may be of the form shown in the drawings or of any other desired form or style.

The operation of my invention is such that the entire weight of the rider, together with the seat and upright spring, are all supported by and rest upon the spring F, which springs also form a brace for the reach and a part of the frame of the machine connecting its parts.

What I claim as new, and desire to secure by Letters Patent of the United States, is—

In a tricycle, the upright spring $a$, supporting the seat, in combination with the circular spring F and reach $d$, all for the purposes above set forth, and substantially as described.

W. LAMARTINE FAY.

Witnesses:
ALLIE E. BRUCE,
E. C. MANTER.